July 9, 1935.  B. L. PRENTICE  2,007,614
MACHINE FOR FORMING WINDOW CHANNELS
Filed Feb. 13, 1930   3 Sheets-Sheet 1
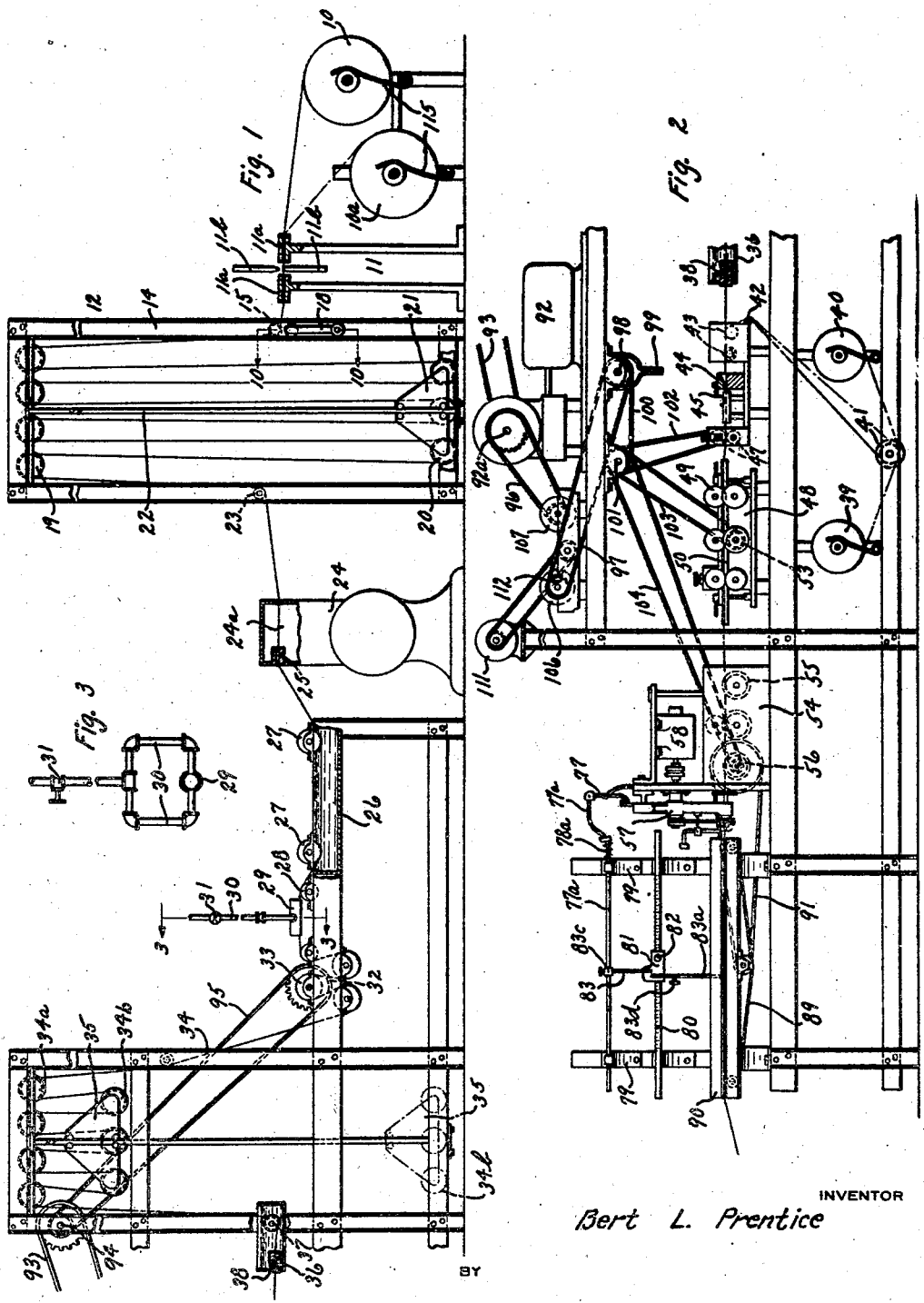
INVENTOR
Bert L. Prentice
BY
Brockett, Hyde, Higley & Meyer
ATTORNEYS

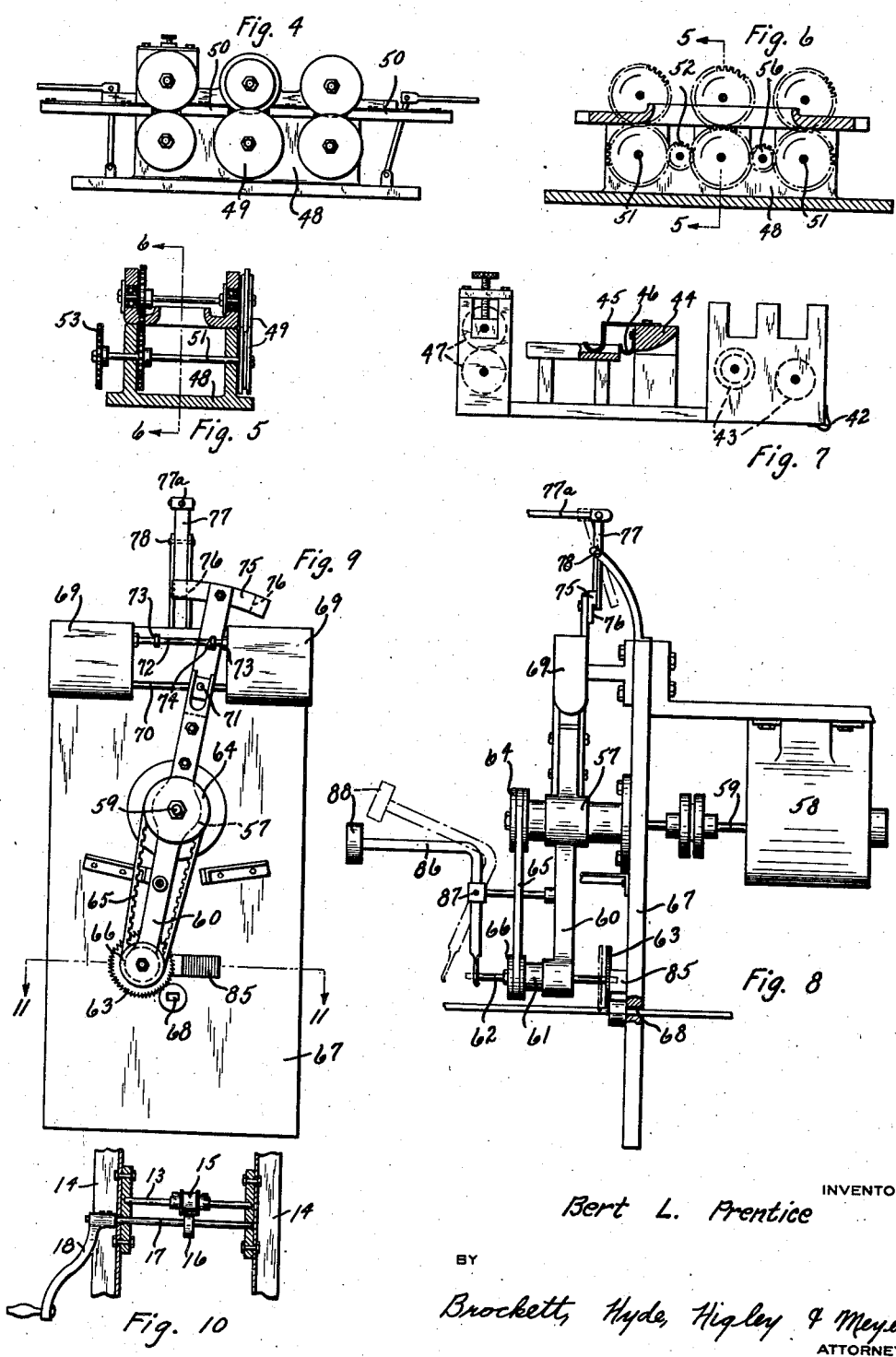

July 9, 1935.   B. L. PRENTICE   2,007,614
MACHINE FOR FORMING WINDOW CHANNELS
Filed Feb. 13, 1930   3 Sheets-Sheet 3

INVENTOR
Bert L. Prentice
BY
Brockett, Hyde, Higley & Meyer
ATTORNEYS

Patented July 9, 1935

2,007,614

UNITED STATES PATENT OFFICE 2,007,614

MACHINE FOR FORMING WINDOW CHANNELS

Bert L. Prentice, East Cleveland, Ohio, assignor to The Reid Products Company, Cleveland, Ohio, a corporation of Ohio Application February 13, 1930, Serial No. 428,208

3 Claims. (Cl. 271—2.1)

This invention relates to machines for forming window channels such as is commonly employed to encase and form guideways for the edges of glass panes in motor vehicles and the like.

The object of the invention is to provide a complete machine embodying all the necessary parts for the continuous production of channel, so that it can be made in indeterminate lengths and hence without pauses, such as are necessary when these channels are made piece by piece.

A further object of the invention is to provide, in a machine of this kind, means enabling it to take care of the splicing of the overlying or superimposed plies of metal and fabric, such as the splicing of the following and leading ends of successive spools of metal strip or of felt, or other fabric, as the case may be.

A further object of the invention is to provide a machine including automatic compensators by which either the later or earlier stages or portions of the machine may be stopped at will, the stopping of one part of the machine not interfering with the operation of another part, all for the purpose of enabling splices to be made, as aforesaid.

A further object is to provide the necessary mechanism for positively feeding the material through the machine and progressively superposing the several layers of material and then forming the composite strip or ribbon into channel shape and cutting it off into any predetermined lengths.

A further object of the invention is to provide improved cut-off mechanism which cuts the material on the fly, or while moving.

A further object of the invention is to provide the necessary change speed mechanism properly organized in the machine to compensate for inaccuracies in sizes of parts, friction or drive of the material, etc., so that all parts properly cooperate with the continuous feed of raw material and delivery of the finished product.

Other objects of the invention are in part obvious and in part will appear more in detail hereinafter.

Figure 14:
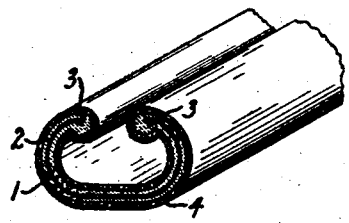
Figure 12:
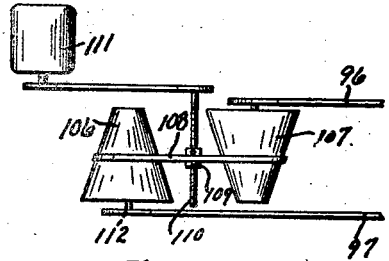
Figure 11:
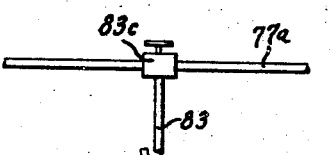
Figure 15:
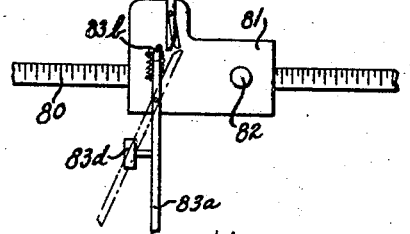
Figure 13:
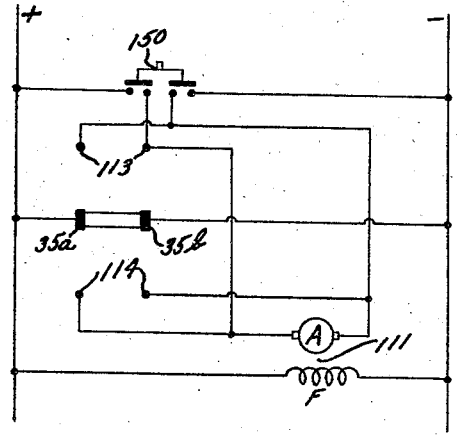

In the drawings, Fig. 1 represents a side elevation, partly diagrammatic, of the first half or feed receiving end of a machine embodying the invention; Fig. 2 is a similar view of the second half or delivery end of the machine; Fig. 3 is a detail sectional view on the line 3—3, Fig. 1; Fig. 4 is a side elevation, on a larger scale, of the forming mechanism; Fig. 5 is a cross section thereof on the line 5—5, Fig. 6: Fig. 6 is a sectional elevation on the line 6—6, Fig. 5; Fig. 7 is a side elevation, on a larger scale, of the felt manipulating parts; Fig. 8 is a side elevation, on a larger scale, of the cut-off devices; Fig. 9 is an end view from the left in Fig. 8; Fig. 10 is a detail sectional elevation on the line 10—10, Fig. 1; Fig. 11 is a detail sectional plan view on the line 11—11, Fig. 9; Fig. 12 is a diagrammatic view of the speed changing mechanism; Fig. 13 is a wiring diagram; Fig. 14 is a detail perspective view of the product; and Fig. 15 is a detail view of certain trigger mechanism.

The present machine is adapted for continuous operation to form into any suitable or desired shape either a single ply or a composite ribbon, but it is more particularly designed to produce composite material. In the particular form shown in the drawings, the machine is designed for the production of a window channel of the general form shown in Fig. 14 and comprising a sheet metal body portion 1 bent into any desirable channel form, said strip being coated on both surfaces with a rubber layer 2 thickened along its edges to form rubber beads or ribs 3, the coated strip being either wholly or partially enclosed, covered, and protected by suitable fabric, such as a layer 4 of thin felt, plush, or the like. Such a felt covered channel is mounted in a groove in the window frame and forms a guide in which the edge of the glass pane slides, either the bare edge of the glass itself or such glass edge encased in a thin jacket of metal, such as brass or other material. The rubber protects the metal and the felt absorbs shock and vibration and enables the glass to slide easily, but at the same time offers a certain amount of friction tending to hold it in place.

In the present machine, this channel is made by proper manipulation of a metal base in ribbon form. In other words, the raw material includes a metal band or ribbon formed of steel or the like which is supplied in the form of coil wound after the fashion of moving picture film. Such ribbon may, for example, be three to five thousand feet long. It is sufficiently thin and flexible to enable it to be wound back and forth through the machine along the path to be defined.

Generally speaking, the process of producing the finished channel consists in passing such a metal ribbon of proper width through a suitable device for coating it with rubber to apply a thin film to both surfaces and to form the necessary rubber beads along its edges; next, the rubber coated ribbon has its surfaces coated with a suitable adhesive, such as rubber cement; next, the layer of fabric, such as felt, is applied to the strip to cover such of its surfaces as should be either protected or encased, this operation being performed by progressively applying to the strip and folding around it a strip of felt or the like from a coil; next, the felt encased flat ribbon or band is subjected to pressure to cause firm adherence of the felt to the rubber; next, the felt encased ribbon is passed through a forming machine to progressively shape it into the desired channel or other cross section; and finally, the material is cut off piece by piece into sections of the desired length. During this series of operations, when the end of a metal coil is reached, the leading end of a succeeding coil is welded thereto without interfering with other operations of the machine, which continue as before, and after the welding operation is completed, the feed of the following coil begins. Likewise, when the end of a coil of felt is reached, the leading end of a succeeding coil is introduced to the machine and is applied to the rubber coated strip at the proper place, and again, the operation of starting the succeeding felt coil does not interfere with other operations in the machine, which proceed as before.

Referring now to the drawings, and particularly to Figs. 1 and 2, 10 and 10a respectively indicate two coils of metal ribbon or band, the first of which is being fed through the machine and the second of which is held in reserve ready for use. Whichever coil is in use, the ribbon therefrom is led to and through a suitable spot welding machine, conventionally illustrated at 11, but which embodies one or more perforated guides 11a through which the material passes and between which are located the electrodes 11b utilized for the spot welding operation.

From the welding machine the ribbon passes to and through a primary compensator marked generally 12. The ribbon enters through a suitable brake, Fig. 10, which is shown as mounted upon the compensator frame 14. It includes a shaft 13 mounted in the frame uprights and carrying a flanged idle roller 15, below which is a clamping member such as a thick disc 16 fixed to and mounted eccentrically upon an operating shaft 17 having a handle 18. The metal ribbon is threaded between members 16 and 15 and is confined between the flanges of the latter. By rotating handle 18 the eccentric clamping member 16 may be turned to bring either its low or its high part up and thereby release or clamp and hold the metal strip.

From the clamp the metal strip is wound back and forth over a series of idle rolls, alternate ones of which, marked 19, are located at the top of the stationary compensator frame and other alternate ones of which, marked 20, are supported on a suitable carriage 21 which rises and falls along guide rods 22. From the last one of the rolls 19 the strip is led around an idle roller 23 and thence to the extruder 24. Of course, the several rolls 19 and 20, as well as other guiding and supporting rolls along which the ribbon travels in this machine, are flanged or interfit, after the fashion of members 15 and 16, so as to confine the strip against lateral movement, as will be readily understood without further reference thereto.

The extruding machine 24 is represented conventionally because it is well known in the rubber art, capable of purchase in the open market at any time. Briefly described, it is built something after the fashion of a sausage grinder, including a chamber 24a, Fig. 1, into which the rubber compound is forced by an expressing screw, (not shown) the excess being continuously delivered from said chamber as a flexible rod. The metal ribbon to be coated with rubber is passed through said chamber by proper slots or openings in opposite casing walls, the discharge slot 25 being accurately shaped with due regard to the dimensions of the metal ribbon to scrape off therefrom all excess rubber compound which otherwise would emerge with the ribbon and thereby leave upon it a coating of uniform thickness on both sides with more or less round thicker portions at its edges to form the rubber beads before referred to. The seats in the rollers or guides in which the strip travels from now on of course are properly shaped to take account of the rubber ribs and of the thickness of the felt, after it is applied. The rubber compound is unvulcanized and relatively hot due to friction, and for the purpose of preventing it from adhering to the rolls and guides later on, the rubber coated strip, beyond the extruder, is immediately passed through a bath of cooling water in a tank 26, being carried beneath guide rolls 27, and thence over a guide roll 28 to a suitable device for removing any excess water. For example, the strip may be passed through a short pipe section 29 to which compressed air may be supplied through a conduit 30 by way of a valve 31. By adjusting this valve the amount of air may be regulated so as to blow off most of the water, leaving a slight quantity still adhering to the rubber to prevent it from sticking to the guide rolls.

From the water remover the rubber coated strip passes to and around the rolls of a primary or input driving unit 32, one of the rolls of which, marked 33, may be power driven in any suitable manner. This driving unit drags the metal ribbon from the spool 10 all the way through the various elements of the machine up to this point, and its travel beyond this point is produced by other feeding means to be described.

From the primary drive unit 32 the rubber coated ribbon passes to and through a second compensator, marked 34 and which, generally speaking, is of the same form and arrangement as the compensator before referred to including relatively stationary rolls 34a at the top of the frame and other rolls 34b mounted on a rising and falling carriage 35. However, the operation of the carriages 35 and 21 is somewhat different, as will later appear.

From the last idle roll at the top of the second compensator the rubber coated strip passes to and through a container for adhesive, such as the vessel 36, which includes a guide roll 37 for the strip and a guide member 38 having an exit orifice so shaped as to remove excess adhesive and leave a thin coating thereof on all surfaces, top and bottom.

Beyond the adhesive tank the strip passes to suitable means for applying to it, folding around it, and pressing into intimate engagement with it, a suitable protecting and cushioning fabric, such as a layer of felt, plush or the like. When it is desired to completely cover the strip on all surfaces leaving no rubber compound exposed, the felt strip is made approximately twice as wide as the rubber coated metal strip. It is supplied, like the metal ribbon, in coil form, two coils 39 and 40 being shown. These felt strips may be three to four hundred feet long. These coils are mounted on spindles below the path of the metal strip, and the felt band from one or the other of said coils is led around an idle roller 41 and thence around a guide shoulder 42 to a position above the guide rolls 43 but beneath the rubber coated strip. In other words, at the first roller 43 the rubbercoated strip is laid upon the felt strip and preferably exactly in the center thereof, leaving one quarter of the total width of the felt strip extending beyond each edge of the metal strip. Referring to Fig. 7 the two superposed strips next enter a folder 44 which is more or less funnel shaped, the curving surfaces at the side edges thereof progressively folding over the extended portions of the felt at the sides and superimposing them upon the upper face of the rubber coated strip. Yielding members, such as the springs 45, 46 press the felt into firm engagement with the rubber and rubber cement, and particularly such springs as 45 and 46 are of approximately the same width as the distance between the rubber beads, so as to crowd the felt tightly to the rubber along the edges of the beads.

The felt coated strip now passes between a pair of feeding and squeezing rollers 47, one of which may be driven, and thence to the forming machine, generally indicated at 48.

The forming machine may be of any suitable character, but usually is provided with rolls, guides, and any other necessary parts to progressively form the felt covered strip into channel or other cross sectional shape. In the arrangement shown the forming machine includes a series of pairs of cooperating flanged rollers 49 with intervening guides 50, the rollers and guides successively being properly shaped for the progressive operation described. Some or all of these rollers are positively driven, the drawings showing all of them intergeared by the shafts 51 and interconnected pinions 52, one of said shafts having a driving sprocket 53.

The details of construction of this forming machine form no part of the present invention, although its manner of operation by progressive formation of a continuously moving fabric covered metal strip is essential for the best results. For example, it may be of the same form as that shown in a copending application of E. W. Livensparger, Ser. No. 285,481, filed June 14, 1928 to which reference may be had if desired.

The forming unit 48 not only serves to shape the formerly flat band into channel cross section but also may serve as the final or output feed or drive to move the strip from the primary feeding unit 32 to the discharge end of the machine, although if desired, other or additional feeding and material moving means may be employed, such as the final or output feeding unit 54, including a series of rolls 55, one or more of which, 56, may be positively driven. The feeding unit 48 alone, however, is sufficient because beyond that unit the material has channel shaped cross section and is more or less rigid and is not laterally flexible as is a flat strip, so that the forming unit 48 not only can pull the flat band to it but can push the channel shaped product beyond it.

Whether an additional feeding unit 54 is used or not, however, the channel shaped product of indefinite length next moves to and beyond a suitable cut-off device, which is preferably so formed as to cut the material on the fly or while moving. This cut-off device is generally indicated at 57 and is illustrated in detail in Figs. 8 and 9. It comprises a suitable support carrying a driver, such as an electric motor 58, which continually rotates a shaft 59 on which is mounted a swinging two armed frame 60. The lower arm of said frame is provided with a sleeve bearing 61 in which is splined to rotate therewith but have axial movement therein a shaft 62 carrying a rotary disc saw blade 63. The driving shaft 59 rotates a pulley 64 from which a belt 65 passes to a pulley 66 on the sleeve 61.

The upper arm of the frame 60 is used for control purposes. On a vertical wall 67 of the frame, through an opening 68 in which the felt covered channel to be severed passes, is mounted an operating motor for producing transverse motion of the saw across the work. This operating motor may be of any suitable form, but preferably operates somewhat like the motor of an ordinary windshield wiper. It is therefore more or less conventionally shown. It includes two opposed cylinders 69 in which are pistons (not shown) on opposite ends of the piston rod 70 having a pivotal connection at 71 to the upper frame arm. Above the piston rod is a valve rod 72 having two collars 73 alternately engaged by an operating projection 74 of the frame arm, while the upper extremity of said arm carries a shouldered segment 75, the shoulders 76 at the opposite ends of which alternately cooperate with a latch 77 pivoted at 78 on the stationary frame and connected to one end of a sliding rod 77a urged by a spring 78a to the right in Fig. 2. The rod 77a slides in guides in two uprights 79 which support a rod 80 along which may be adjusted a carrier 81 provided with a clamp screw 82 by which it may be fixed to its guiding rod 80. On said carrier are pivoted an upper lever 83 and a lower lever 83a having a spring trigger 83b. Lever 83 is provided at its upper end with a suitable pivot fitting 83c capable of attachment at any point to the rod 77a. Trigger 83b snaps past the lower arm of lever 83 when moved to the left in Fig. 15 and serves to positively actuate it when moved to the right. The lower end of lever 83a extends into the path of movement of the channel material and said lever is urged in one direction by a weight 83d.

Opposite one end of the saw shaft 62 the frame wall 67 is provided with a double inclined cam 85, while opposite its other end is one arm of a lever 86 pivoted at 87, its other arm being provided with a weight 88.

Beyond the saw the material passing from the machine moves into a position above a constantly travelling endless belt 89 which forms the bottom of a trough having side walls 90. One of the pulleys or rollers guiding said belt may be positively driven or rotated by any suitable means, such as by the belt 91, to cause the upper strand of the belt to move to the left in Fig. 2.

The machine is operated by any suitable power source, such as by the two speed electric motor 92. This motor directly drives the primary feeding unit 32, no clutch or other power interrupting medium being necessary in this drive train. For example, one end of a motor driven shaft 92a, may be provided with a sprocket, not shown, from which a chain 93 passes to an intermediate sprocket on a shaft 94 operatively connected by the chain 95 to the primary feeding unit 32.

The same motor 92, however, also drives the other positively driven parts of the machine, but in this case preferably through speed changing and power drive interrupting means. For example, the other end of the shaft 92a may be connected by a chain 96 to drive any suitable form of change speed mechanism, such as what is known as a Reeves drive, conventionally shown in Fig. 12, and from which a driving chain 97 extends to a shaft 98 on which is suitable clutch mechanism, including a controlling clutch lever 99. When said clutch is closed a connected drive is established from the Reeves unit through shaft 98 and by way of a chain 100 to the shaft 101, from which power drive is taken off by the chains 102, 103 and 104 respectively to the feed and pressure rolls 47, to the forming unit 48, and to the feed roll 56. Another chain 91 from the shaft 56 may drive the final discharge belt 89.

While any form of speed changing mechanism is suitable for the purpose, the drawings show conventionally the Reeves drive which includes a pair of parallel but reversely disposed cone pulleys 106, 107, over which travel an endless driving member 108, the position of which lengthwise of the cone pulleys may be varied by progressive movement of a shifting fork 109 by means of the screw 110, said screw being rotatable either by hand or by power drive from a small reversible motor 111. The power drive from the motor 92 to the speed changing mechanism is by means of the belt 96 to a sprocket on the cone 107 and the power take off is from a sprocket 112 on the other cone.

The operation is as follows:

Let us assume that the machine is completely threaded up with both the metal and felt ribbons and all necessary supplies of adhesive, water, compressed air, etc., and is operating under normal conditions. The circuit to the motor 92 is provided with switching mechanism so that it may be operated at either fast or slow speed, but this is merely a question of relative capacity and may be disregarded. The clutch at 99 of course is closed and the motor 58 for the cut-off saw is operating so that the saw is continuously rotated. The saw, however, is held stationary at one side of the work by engagement of the latch 77 with one of the shoulders 76, even though the compressed air from the source to a cylinder 69 tends to swing the saw frame to the opposite position, due to the position of the valves, as will be readily understood.

The carrier 21 in the first compensator is at its lowest point, so that the first compensator is filled with metal ribbon extending back and forth vertically between the rollers 19, 20. The carrier 35 at the second compensator is at or near its upper limit of travel, due to control by this carrier of the speed of the change speed mechanism and the rate of rotation imparted to the later units of the machine. For this purpose the carrier 35 at the second compensator carries wiping contacts 35a, 35b which cooperate with upper and lower limit switch contacts 113, 114, the former placed near the top of the second compensator frame and the latter at a lower point, said switch contacts being in reverse circuits to the motor 111 so that closing of one or the other of said switches rotates said motor in one or the other of its two directions and increases or diminishes the speed of the change speed transmission mechanism. These circuits are both normally open and are closed only momentarily while the wiping contacts 35a, 35b are at one or the other of the contacts 113, 114. (See Fig. 13.)

The metal ribbon travels from the supply spool idly through the spot welding unit 11, thence through the brake and around the rollers of the first compensator, thence to and through the extruder where it receives its coating of rubber, thence through the water bath where the hot plastic layer of rubber compound is cooled, thence to the air blast where most of the water is taken off and thence to the primary drive unit 32, which pulls the said metal strip through the machine to this point. Of course, the coils 10 and 10a are preferably provided with suitable friction brakes 115 to prevent overwinding, but the weight of the carrier 21 is sufficient to overcome the effect of such friction brakes 115 and keep said carrier at its lower point, with the first compensator full of metal ribbon. This compensator maintains a tension on the ribbon or band.

From the first drive unit 32 the metal strip proceeds to and through the second compensator, and thence to the adhesive bath and so on. In this case, assuming the carrier 35 at a high but intermediate point, the switch contacts 113, 114 are open. If the speed of the change speed mechanism is low, so that the later units of the machine are driven at relatively low speed and move the material slower than the rate of input at the first feed unit 32, then the excess of material collects, under more or less tension, at the second compensator and its carrier 35 moves down, until finally, the contacts 114 are closed and motor 111 is rotated to increase the speed of the change speed mechanism and consequently the speed of the later units of the machine until the output overtakes the input. If the rate of output exceeds the rate of input, the contacts 113 are closed and the speed of the Reeves drive is reduced, and so on.

At the adhesive bath excess adhesive is wiped off, and beyond it the rubber coated strip is applied to the felt strip, the edges of the latter are folded over and the felt is pressed down, then the felt covered strip passes through the forming machine and is shaped to channel cross section. Beyond the forming unit the channel shaped product of indefinite length passes through the secondary feed unit, if one is used, and moves past the rotating saw, which lies alongside its path of movement, until finally the advancing or leading end of the channel engages the lever 83a and moves lever 83 to the dotted line position Fig. 15, thereby tripping the latch 77 out of engagement with the shoulder 76 and releasing the saw frame for actuation by one of its operating pistons. The saw therefore swings toward the work. Its rotating shaft is yieldingly pressed endwise upon the cam 85, and as the saw moves laterally across the work the cam causes it to also move longitudinally with the work. Moreover, after the saw has nicked the work the work itself becomes a driver to carry the saw along with it. As a consequence, the saw travels through the work to produce a square cut, even though the work continues to move. When the saw has passed clear through the work, the latch 77 engages with the other shoulder 76 and holds the saw stationary ready for another actuation by the newly produced leading end of the strip. The motor valves (not shown) have also been reset and the saw retracted by the weight 88. The cut off piece of material falls upon the belt 89 and is advanced endwise and is discharged from the machine.

The machine operates in the manner described so long as material is available. When the workman perceives that the roll of metal ribbon is about to become exhausted, he applies his hand to the handle of the brake or clamp shown in Fig. 10, and by operation thereof mechanically seizes and holds the trailing end of the exhausting coil in such manner as to leave the extreme end thereof in the zone of operation of the spot welder 13. The leading end of the next coil is then pulled up and threaded into the spot welder and is welded to the trailing end of the exhausting coil. This operation is carried out with care, sufficient spot welds being produced to form a firm joint, the edges being filed off and smoothed so that the double thickness will readily pass through all guiding passages in the machine. The operation takes but a very short time, say but a minute, and while it is going on travel of the material through the machine up to the brake ceases. However, the primary feed unit continues to operate and to drive the material through the extruder and water bath, the carrier 21 rising and supplying material for the purpose from the excess present in the first compensator. The parts are so designed that a complete weld or joint of the character described can be accomplished before the first compensator is exhausted of its excess material. When the joint is perfected the brake is released and the new coil begins to feed into the machine, the carrier 21 at the first compensator moving downwardly until it becomes filled, when all operations proceed as before.

In the case of a splice in felt the operation is different. Here, when the operator sees that one felt coil is nearly exhausted, he first closes a hand switch 150, Fig. 13, in parallel around the switch contacts 114 to compel the carrier 35 to rise to a high point if it is too low. He then throws out the clutch 99 at the proper time to leave the trailing end of the first coil of felt near the guide rollers 43. Opening the clutch 99 stops the forming unit and the final feed unit 54, if it is used, so that movement of the material through the latter half of the machine ceases. The primary feeding unit, however, continues to supply its material and the second compensator absorbs the excess material thus introduced into the machine by downward travel of its carrier 35. The operator brings up the leading end of the second spool of felt and lays it in position beneath the rubber coated strip and then forcibly drags the felt covered strip forwardly by hand to thread the felt to and through the folding unit 44 and possibly partly or wholly through the forming unit 48. This operation takes a very short time, say thirty seconds or so, during which the carrier 35 has sufficient downward travel to absorb any excess. When the felt splice is completed the clutch 99 is again thrown in and the operation proceeds as before. Of course, during splices of either metal or felt the motor 92 is run at slow speed, its high speed being utilized only when no splices are imminent and rapid production is desired.

What I claim is:

1. Apparatus of the class described, comprising means for operating upon a flexible metal band, a band receiving and storing means through which said band passes to said operating means, said receiving and storing means being so constructed and arranged as to normally contain but a small quantity of said band but capable of containing a relatively large quantity thereof, means for normally causing continuous movement of said band to said receiving and storing means and for normally causing continuous movement of said band from said receiving and storing means to said operating means, operator controlled means for temporarily stopping the movement of said band from said receiving and storing means to said operating means, the parts being so constructed and arranged that upon a cessation of movement of said band from said receiving and storing means to said operating means, said receiving and storing means continues to receive and thereafter contains the band delivered thereto, said receiving and storing means including two sets of rollers over which said band travels, the rollers of one of said sets being rotatably mounted upon a vertically movable carriage, driving means for said operating means, and means actuated by said carriage for controlling said driving means.

2. Apparatus of the class described, comprising means for operating upon a flexible metal band, a band receiving and storing means through which said band passes to said operating means, said receiving and storing means being so constructed and arranged as to normally contain but a small quantity of said band but capable of containing a relatively large quantity thereof, means for normally causing continuous movement of said band to said receiving and storing means and for normally causing continuous movement of said band from said receiving and storing means to said operating means, operator controlled means for temporarily stopping the movement of said band from said receiving and storing means to said operating means, the parts being so constructed and arranged that upon a cessation of movement of said band from said receiving and storing means to said operating means, said receiving and storing means continues to receive and thereafter contains the band delivered thereto, said receiving and storing means including two sets of rollers over which said band travels, the rollers of one of said sets being rotatably mounted upon a vertically movable carriage, driving means for said operating means, and means actuated by vertical movement of said carriage for controlling said driving means.

3. Apparatus of the class described, comprising means for operating upon a flexible metal band, a band receiving and storing means through which said band passes to said operating means, said receiving and storing means being so constructed and arranged as to normally contain but a small quantity of said band but capable of containing a relatively large quantity thereof, means for normally causing continuous movement of said band to said receiving and storing means and for normally causing continuous movement of said band from said receiving and storing means to said operating means, operator controlled means for temporarily stopping the movement of said band from said receiving and storing means to said operating means, the parts being so constructed and arranged that upon a cessation of movement of said band from said receiving and storing means to said operating means, said receiving and storing means continues to receive and thereafter contains the band delivered thereto, and means for automatically causing said receiving and storing means to reduce to a minimum the quantity of the band contained therein upon a resumption of movement of said band from said receiving and storing means to said operating means.

BERT L. PRENTICE.